United States Patent
Yagisawa (10) Patent No.: US 8,721,349 B2
(45) Date of Patent: May 13, 2014

(54) CONNECTOR, OPTICAL TRANSMISSION DEVICE, AND CONNECTOR CONNECTION METHOD

(75) Inventor: Takatoshi Yagisawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 204 days.

(21) Appl. No.: 13/189,931

(22) Filed: Jul. 25, 2011

(65) Prior Publication Data

US 2012/0063785 A1    Mar. 15, 2012

(30) Foreign Application Priority Data

Sep. 9, 2010  (JP) .................................. 2010-201530

(51) Int. Cl.
*H01R 12/00*    (2006.01)

(52) U.S. Cl.
USPC ......................................................... 439/67

(58) Field of Classification Search
USPC ........ 439/66, 67, 876, 82; 361/774, 784, 715, 361/790; 257/E23.2
See application file for complete search history.

(56) References Cited

U.S. PATENT DOCUMENTS

| | | | | |
|---|---|---|---|---|
| 3,832,603 A | * | 8/1974 | Cray et al. | 361/790 |
| 5,006,922 A | * | 4/1991 | McShane et al. | 257/697 |
| 5,101,322 A | * | 3/1992 | Ghaem et al. | 361/715 |
| 5,132,879 A | * | 7/1992 | Chang et al. | 361/784 |
| 5,617,300 A | * | 4/1997 | Anzawa et al. | 361/795 |
| 6,347,042 B1 | * | 2/2002 | White | 361/784 |
| 6,830,460 B1 | * | 12/2004 | Rathburn | 439/66 |
| 7,448,923 B2 | * | 11/2008 | Uka | 439/876 |
| 7,785,113 B2 | * | 8/2010 | Mizoguchi | 439/67 |
| 7,878,820 B2 | * | 2/2011 | Tada et al. | 439/67 |
| 2008/0254653 A1 | * | 10/2008 | Uka | 439/67 |
| 2009/0029570 A1 | * | 1/2009 | Ikeuchi et al. | 439/67 |
| 2009/0253275 A1 | * | 10/2009 | Tada et al. | 439/66 |
| 2012/0286904 A1 | * | 11/2012 | Ikeuchi et al. | 333/260 |

FOREIGN PATENT DOCUMENTS

| | | |
|---|---|---|
| JP | 2005-44769 | 2/2005 |
| JP | 2006-295101 | 10/2006 |
| JP | 2009-38250 | 2/2009 |
| JP | 2009-283901 | 12/2009 |
| JP | 2010-73786 | 4/2010 |

* cited by examiner

*Primary Examiner* — Alexander Gilman
(74) *Attorney, Agent, or Firm* — Staas & Halsey LLP (57) ABSTRACT

A connector includes an electrode sheet, a cover, and a resistor sheet. A plurality of electrodes are attached on a side of the electrode sheet. The electrode sheet is an insulator. The cover covers the electrode sheet. The resistor sheet is provided between the cover and the electrode sheet and has electrical resistivity.

21 Claims, 14 Drawing Sheets

CONNECTOR, OPTICAL TRANSMISSION DEVICE, AND CONNECTOR CONNECTION METHOD

CROSS-REFERENCE TO RELATED APPLICATIONS

This application is based upon and claims the benefit of priority of the prior Japanese Patent Application No. 2010-201530, filed on Sep. 9, 2010, the entire contents of which are incorporated herein by reference.

BACKGROUND

1. Field

Various embodiments described herein relate to a connector, an optical transmission device, and a connector connection method.

2. Description of the Related Art

Signal connections between printed circuit boards and devices, performed through connectors using flexible printed circuit boards (Flexible Printed Circuits: FPC), have been widely prevalent in the mounting design of electronic devices.

Since the flexible printed circuit boards are printed circuit boards having flexibility, and the printed circuit boards can be bent or folded, the flexible printed circuit boards are heavily used for small products such as mobile phones, digital cameras, and the like in which mounting spaces are limited.

On the other hand, in electronic devices of recent years, the sizes and weight thereof and the thicknesses of devices have been rapidly reduced, and the miniaturization of semiconductor components and passive components has progressed. Therefore, high-density mounting has been requested.

In such a situation, connectors that connect the wirings of the printed circuit boards with the wirings of the flexible printed circuit boards have also been multi-pinned, and there has been an increasing need for the narrower pitch and the wider bandwidth of a connector unit.

As a technique of the related art, in Japanese Unexamined Patent Application Publication No. 2009-38250, a wiring circuit board is proposed that promotes the suppression of conduction noise. In addition, in Japanese Unexamined Patent Application Publication No. 2005-044769, a flat cable coupler is proposed that has a wider bandwidth. Furthermore, in Japanese Unexamined Patent Application Publication No. 2009-283901, a high-flex coverlay film is proposed that is used for a flexible printed circuit board. Furthermore, in addition, in Japanese Unexamined Patent Application Publication No. 2010-73786, a printed-wiring board is proposed whose conductor layer is disposed between a high-speed signal line and a resistor layer.

However, in a connector of the related art, there is a risk that, at the electrode portion of the connector connected to a GND passing between signal lines, a high-frequency characteristic possibly deteriorates owing to the occurrence of a noise, and there has been a problem that it is difficult to transmit a high-speed signal (for example, greater than or equal to 25 Gb/s) with high quality.

SUMMARY

In view of such problems, according to an aspect of an embodiment of the present invention, a technology is disclosed to provide a connector that includes an electrode sheet, a cover, and a resistor sheet. A plurality of electrodes are attached on a side of the electrode sheet. The electrode sheet is an insulator. The cover covers the electrode sheet. The resistor sheet is provided between the cover and the electrode sheet and has electrical resistivity.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
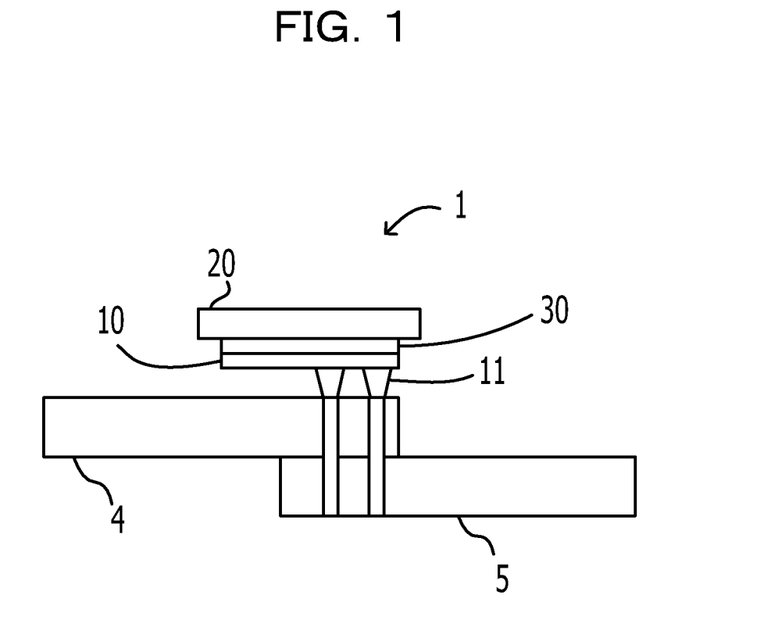
FIG. 1 is a diagram illustrating an example of a configuration of a connector.

Hereinafter, an embodiment of the present invention will be described with reference to figures. FIG. 1 is a diagram illustrating an example of the configuration of a connector. A connector 1 includes a bump sheet (electrode sheet) 10, a cover 20, and a resistor sheet 30, and is a high-frequency connector that performs the electrical connection of a high-frequency signal, for example.

A bump (electrode) 11 is attached to the bump sheet 10. The cover 20 covers the bump sheet 10. The resistor sheet 30 is a sheet having electrical resistivity, which is provided between the cover 20 and the bump sheet 10.

In the connection to a board, based on the connector 1, for example, with respect to one transmission path and the other transmission path, which form a pair of transmission paths on a flexible printed circuit board 4, the bump 11 connects one transmission path to a printed circuit board 5 and connects the other transmission path to a printed circuit board 5.

Next, as an example of the wiring connection of the connector 1, a case will be described in which the connector 1 is applied to an optical transmission device used in an optical interconnect. The optical interconnect is a generic term used to refer to communication in which, using light, short-distance data transmission is performed between circuits within a semiconductor chip, between parts within a computer, between computers, or the like. The optical interconnect can realize a wide bandwidth and low power consumption, compared with electrical communication based on the copper wiring or the like of the related art.

Figure 2:
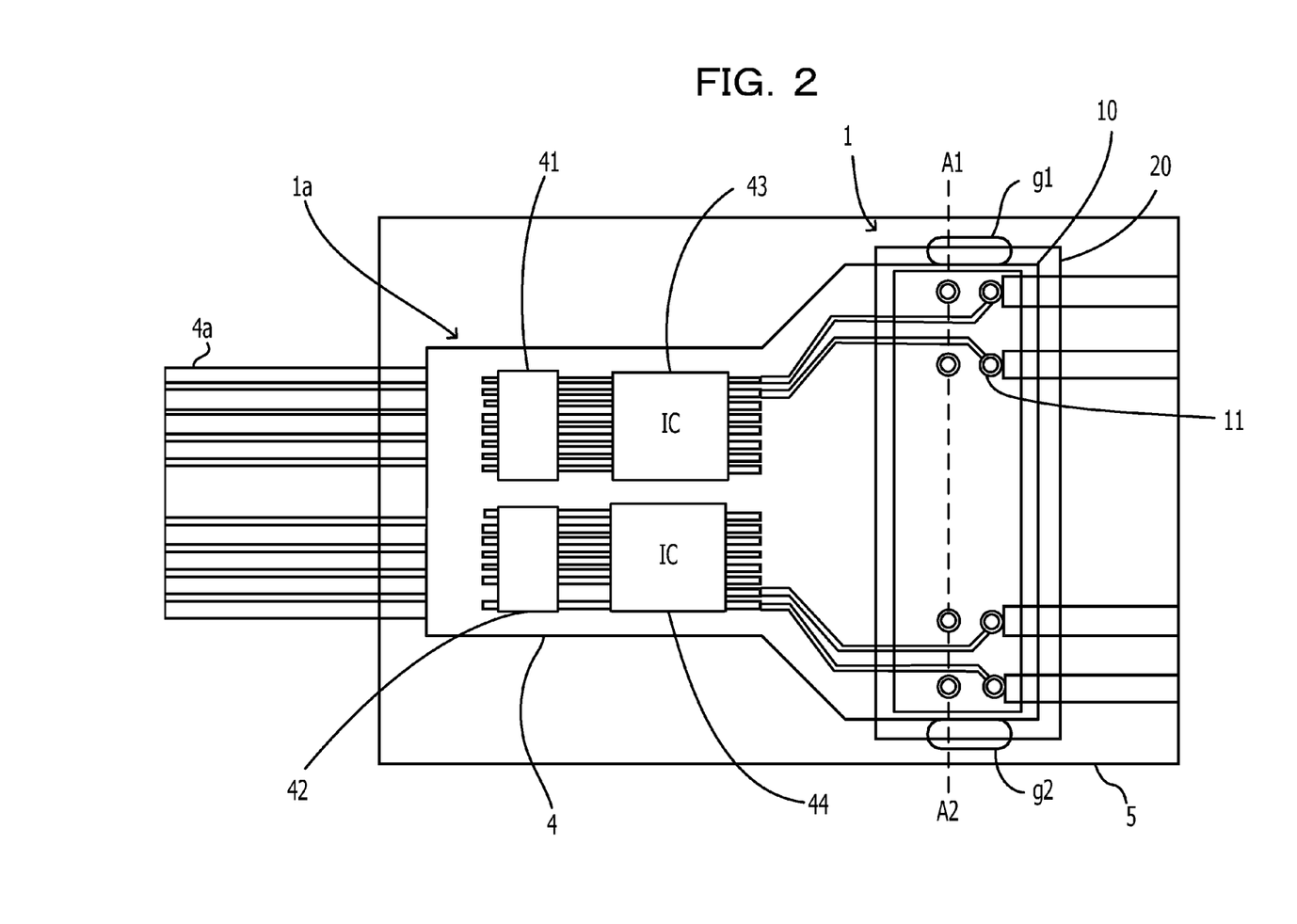
FIG. 2 is a diagram illustrating an example of a configuration of an optical transmission device.
Figure 3:
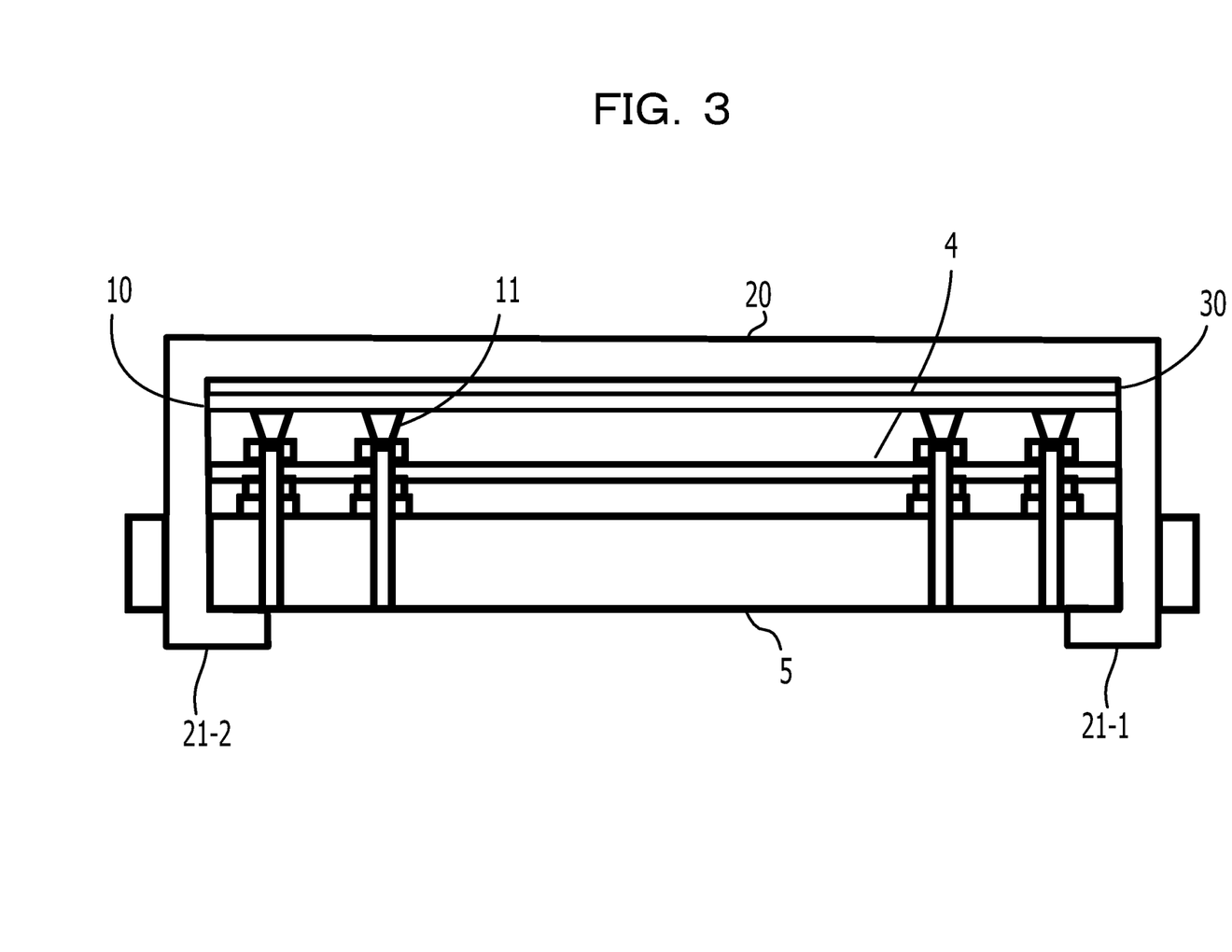
FIG. 3 is a cross-section diagram along A1-A2 in FIG. 2.

FIG. 2 is a diagram illustrating an example of the configuration of an optical transmission device. FIG. 3 is a cross-section diagram along A1-A2 in FIG. 2. An optical transmission device 1a includes the flexible printed circuit board 4 and the connector 1, and is a device that performs optical transmission and reception and O/E or E/O conversion, as optical transmission processing, for example. In the figure, a state is illustrated in which the flexible printed circuit board 4 is connected to the printed circuit board 5 using the connector 1.

For example, a light emitting element 41 (for example, a Vertical Cavity Surface Emitting Laser (VCSEL)), a light receiving element 42 (for example, a Photodiode (PD)), an IC 43 that is a driver having V/I conversion function, and an IC 44 that has an I/V conversion function and performs transimpedance amplification are mounted on the flexible printed circuit board 4, as an optical transmission processor. In addition, a polymer waveguide 4a, which is a sheeted optical waveguide capable of being laminated on the flexible printed circuit board 4, is connected to the light emitting element 41 and the light receiving element 42.

In addition, with respect to transmission between the ICs 43 and 44 and the printed circuit board 5, differential transmission is performed. Accordingly, in the ICs 43 and 44, transmission is performed in which signals of a positive (P) channel and a negative (N) channel, whose phases are opposite to each other, are used with a pair of signal lines being used for one channel signal.

On the other hand, the connector 1 includes the bump sheet 10, the cover 20, and the resistor sheet 30. On the bump sheet 10, bumps 11 that are projected electrodes are two-dimensionally placed and formed, thereby correctly performing the position adjustment of the flexible printed circuit board 4 and reliably establishing a connection with the printed circuit board 5 or an electronic component on the other connection side. In addition, the bump sheet 10 itself is made of insulation material, and the metallic bumps 11 are attached to one surface side of the bump sheet 10.

In addition, on the back surface side of the bump sheet 10, to which no bump 11 is attached, the cover 20 is located across the resistor sheet 30. The cover 20 has a thin-plate shape, and at both ends thereof, the mechanisms of detachable hooks 21-1 and 21-2 are provided.

At the time of connector connection, owing to the hooks 21-1 and 21-2, the cover 20 is mechanically locked into guide holes g1 and g2 provided in the printed circuit board 5, thereby applying uniform pressure to the plural bumps 11 and being connected to the printed circuit board 5.

When the flexible printed circuit board 4 and the printed circuit board 5 are connected to each other, first, a plurality of PADs of the flexible printed circuit board 4 is placed on a plurality of PADs on the printed circuit board 5. Furthermore, the bumps 11 formed on the bump sheet 10 are placed on the PADs of the flexible printed circuit board 4.

In addition, by pressing the cover 20 from above, the bump 11 of the connector 1, the PAD of the flexible printed circuit board 4, and the PAD of the printed circuit board 5 are pressure-bonded. Accordingly, the PAD of the flexible printed circuit board 4 and the PAD of the printed circuit board 5 are connected to each other, and the wiring of the flexible printed circuit board 4 and the wiring of the printed circuit board 5 are connected to each other (in addition, in FIG. 2, the connector 1 is illustrated in a transparent manner, and connection states between transmission lines on the flexible printed circuit board 4 and transmission lines on the printed circuit board 5 through the bumps 11 are illustrated so as to be viewable).

As the flow of a signal, an electrical signal transmitted from the printed circuit board 5 is received by the IC 43 on the flexible printed circuit board 4 through the bump 11 of the connector 1. The IC 43 performs V/I conversion, and converts a voltage signal into a current signal. The light emitting element 41 performs E/O conversion, and converts the current signal output from the IC 43 into an optical signal. The optical signal is output to the outside through the polymer waveguide 4a.

On the other hand, the optical signal transmitted through the polymer waveguide 4a is received by the light receiving element 42 and converted into an optical current signal. The IC 44 converts the optical current signal into a voltage signal and output the voltage signal. The voltage signal output from the IC 44 is connected to a transmission line on the printed circuit board 5 through the bump 11 of the connector 1.

Next, the resistor sheet 30 will be described. The basic connection operation of the connector 1 is to electrically connect, as two boards, the PAD of the flexible printed circuit board 4 and the PAD of the printed circuit board 5 to each other, for example, and to depress and fix the bump sheet 10 on which the bumps 11 are disposed, using the cover 20.

In this case, when the bump sheet 10 is depressed using the metallic cover 20, the metallic portion of the cover 20 turns out to be adjacent to the top of the metallic bump 11 connected to a transmission line, and hence a noise occurs between the metallic portion thereof and the bump 11. Consequently, a high-frequency characteristic is deteriorated, and it is difficult to realize the transmission of a high-speed signal.

Therefore, as described, in the present technique, the resistor sheet 30 that is several micrometers thick is inserted between the bump sheet 10 and the cover 20. In particular, the resistor sheet 30 is provided at a position that suppresses a noise occurring through the bump 11 connected to the board. Accordingly, the occurrence of the noise is reduced, the deterioration of the high-frequency characteristic is suppressed, and the wider bandwidth of a transmission signal is promoted.

Next, the simulation result of the transmission characteristic of each of a connector including no resistor sheet 30 and the connector 1 including the resistor sheet 30 will be described. First, the connector including no resistor sheet 30 (referred to as "connector 100") will be described.

As a result of the simulation in which wiring connection is performed using the connector 100, a noise component having the highest level is detected in a portion where a bump connected to a GND line and a cover are adjacent to each other, with respect to a noise occurrence point.

Figure 4:
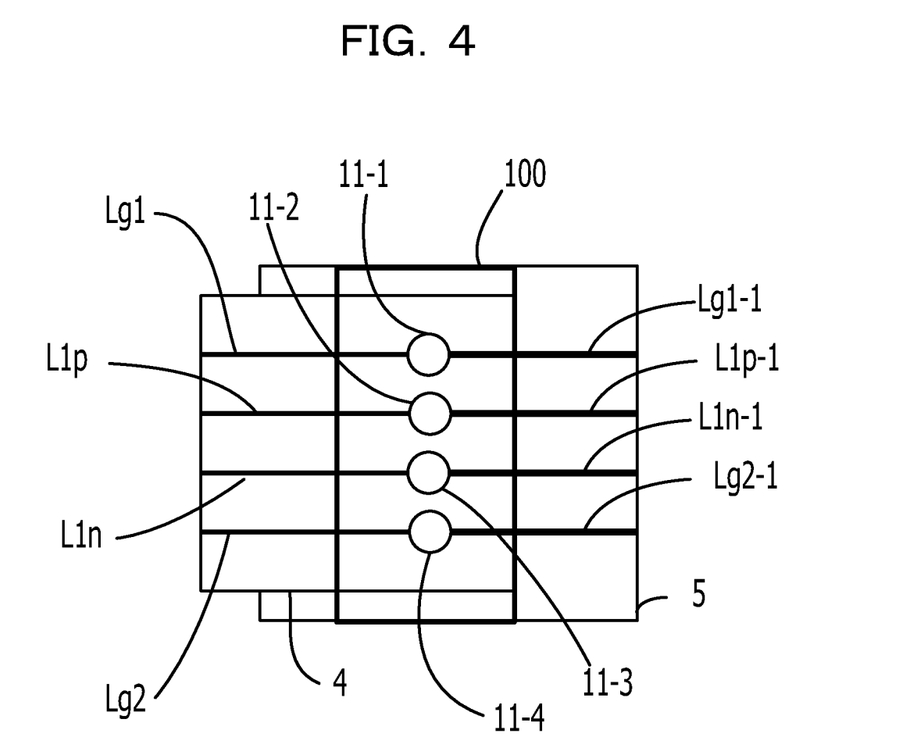
FIG. 4 is a diagram illustrating a bump connection portion.

FIG. 4 is a diagram illustrating a bump connection portion. In addition, in FIG. 4, the connector 100 is illustrated in a transparent manner, and connection states between transmission lines on the flexible printed circuit board 4 and transmission lines on the printed circuit board 5 through the bumps 11-1 to 11-4 are illustrated so as to be viewable.

As a bump connection portion, it is assumed that the signal lines of differential transmission paths L1p and L1n on the flexible printed circuit board 4 are placed between GND lines Lg1 and Lg2, and such high-speed signal line placement of GSSG is connected to the printed circuit board 5 through the bumps 11-1 to 11-4.

Describing a connection relationship, at the bumps 11-1 to 11-4 of the connector 100, the GND line Lg1 on the flexible printed circuit board 4 and a GND line Lg1-1 on the printed circuit board 5 are connected to each other through the bump 11-1.

The signal line L1p on the flexible printed circuit board 4 and a signal line L1p-1 on the printed circuit board 5 are connected to each other through the bump 11-2. The signal line L1n on the flexible printed circuit board 4 and a signal line L1n-1 on the printed circuit board 5 are connected to each other through the bump 11-3. The GND line Lg2 on the flexible printed circuit board 4 and a GND line Lg2-1 on the printed circuit board 5 are connected to each other through the bump 11-4.

Figure 5:
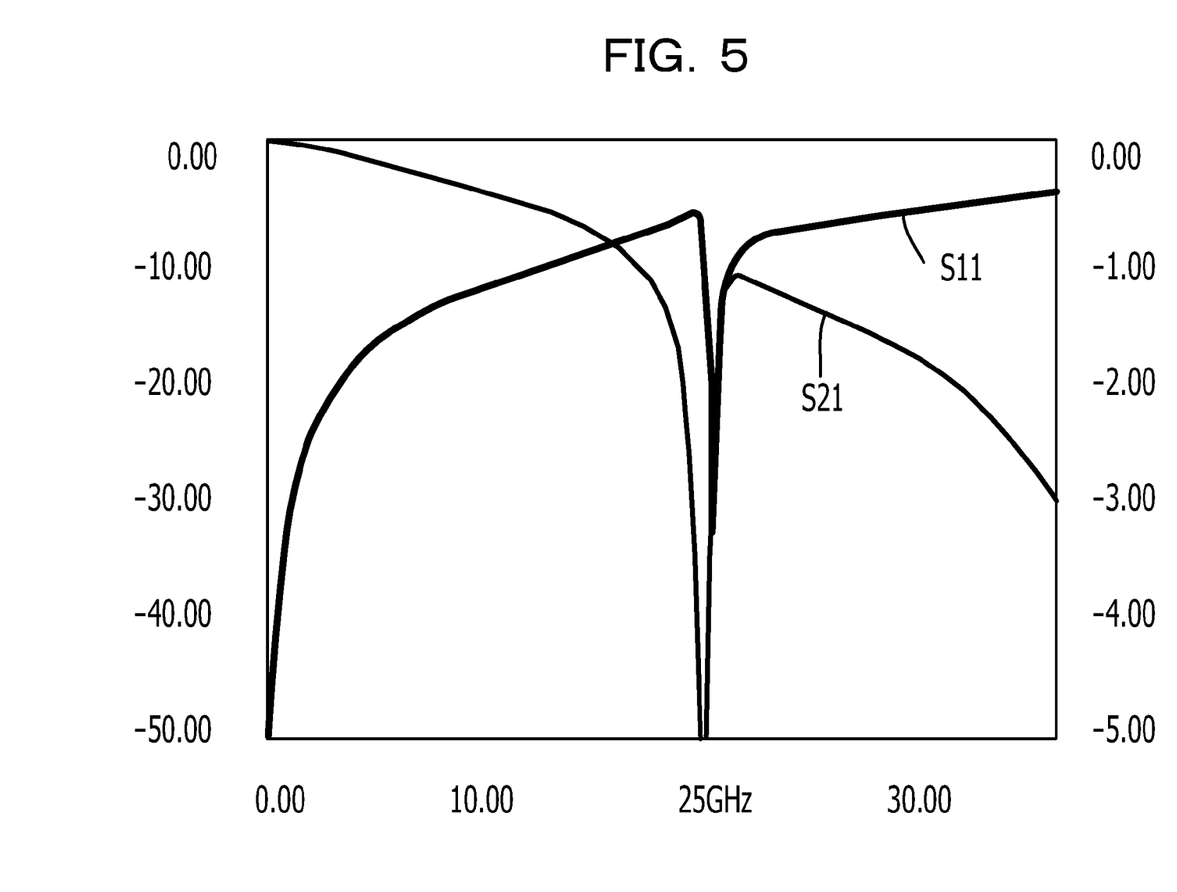
FIG. 5 is a diagram illustrating a loss characteristic.

FIG. 5 is a diagram illustrating a loss characteristic. An S11 parameter (a reflectance loss characteristic) and an S21 parameter (an insertion loss characteristic) when wiring connection is performed using the connector 100 are illustrated. A horizontal axis is a frequency (GHz), a left-side vertical axis is a reflection loss level (dB), and a right-side vertical axis is an insertion loss level (dB).

Using the connector 100 including no resistor sheet 30, such bump connections as illustrated in FIG. 4 are performed, and a signal is transmitted through the signal lines L1p and L1n. Consequently, in a portion where the bump 11-1 connected to the GND lines Lg1 and Lg1-1 and the cover 20 are adjacent to each other and a portion where the bump 11-4 connected to the GND lines Lg2 and Lg2-1 and the cover 20 are adjacent to each other, a noise having a high level occurs.

Namely, in a portion where the bump 11-1 and the cover 20 are adjacent to each other and a portion where the bump 11-4 and the cover 20 are adjacent to each other, a noise that can be regarded as an eddy current due to an unnecessary self-resonant frequency occurs that has a high level.

In this case, as illustrated in the simulation result in FIG. 5, it is detected that the cutoff of the frequency of the transmission signal occurs in the vicinity of 25 GHz, and it is recognized that wider bandwidth transmission greater than or equal to 25 GHz is prevented.

Next, the connector 1 including the resistor sheet 30 will be described. In the connector 1, the resistor sheet 30 is disposed between the bump sheet 10 and the cover 20. In this regard, however, if the resistor sheet 30 is disposed on the whole surface of the bump sheet 10, the resistor sheet 30 is also adjacent to a bump connected to a signal line, thereby badly influencing high-speed transmission.

Accordingly, the resistor sheet 30 is provided at a position that suppresses a noise occurring through an electrode connected to a board. Specifically, as described above, since, in a portion where a bump connected to the GND line and the cover are adjacent to each other, a noise component having a high level occurs, the resistor sheet 30 is disposed in a portion where a bump other than the bump connected to the signal line, which is connected to the GND line, and the cover are adjacent to each other.

Figure 6:
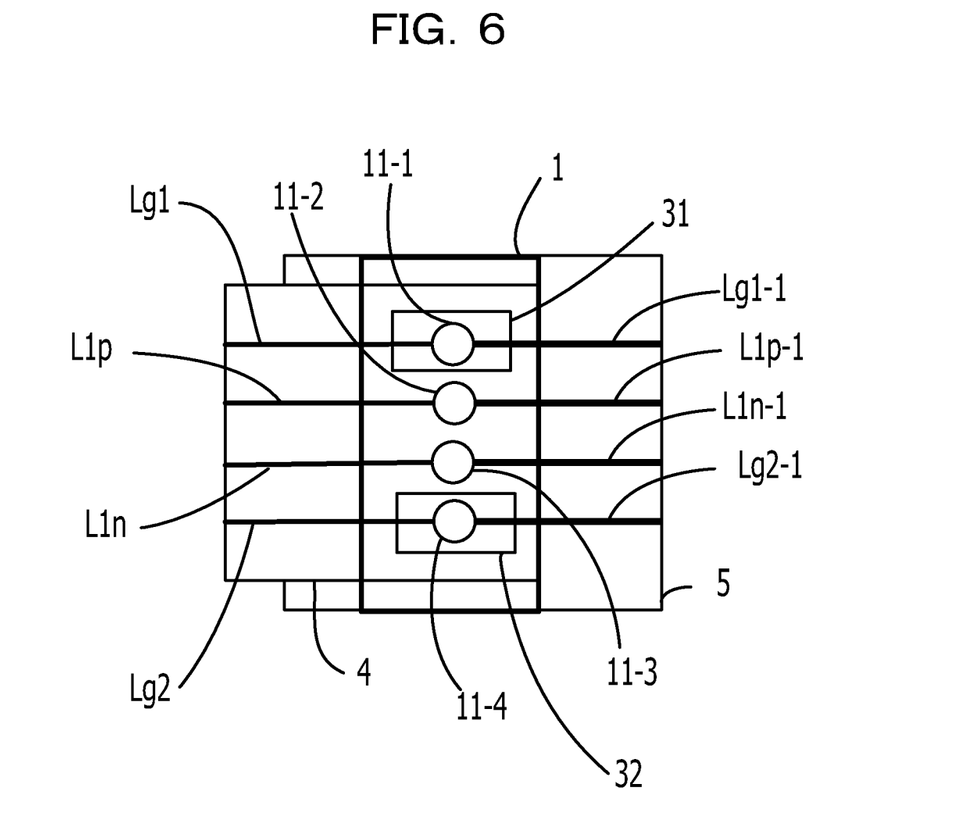
FIG. 6 is a diagram illustrating a bump connection portion.

FIG. 6 is a diagram illustrating a bump connection portion. In addition, in FIG. 6, the connector 1 is illustrated in a transparent manner, and connection states between transmission lines on the flexible printed circuit board 4 and transmission lines on the printed circuit board 5 through the bumps 11-1 to 11-4 are illustrated so as to be viewable.

As a bump connection portion, it is assumed that the signal lines of the differential transmission paths L1p and L1n on the flexible printed circuit board 4 are placed between the GND lines Lg1 and Lg2, and such high-speed signal line placement of GSSG is connected to the printed circuit board 5 through the bumps 11-1 to 11-4. The way of wiring is the same as in FIG. 4.

In addition, a resistor sheet 31 is provided on a portion of the bump sheet 10, located above the bump 11-1 connected to the GND lines Lg1 and Lg1-1. Furthermore, a resistor sheet 32 is provided on a portion of the bump sheet 10, located above the bump 11-4 connected to the GND lines Lg2 and Lg2-1.

Figure 7:
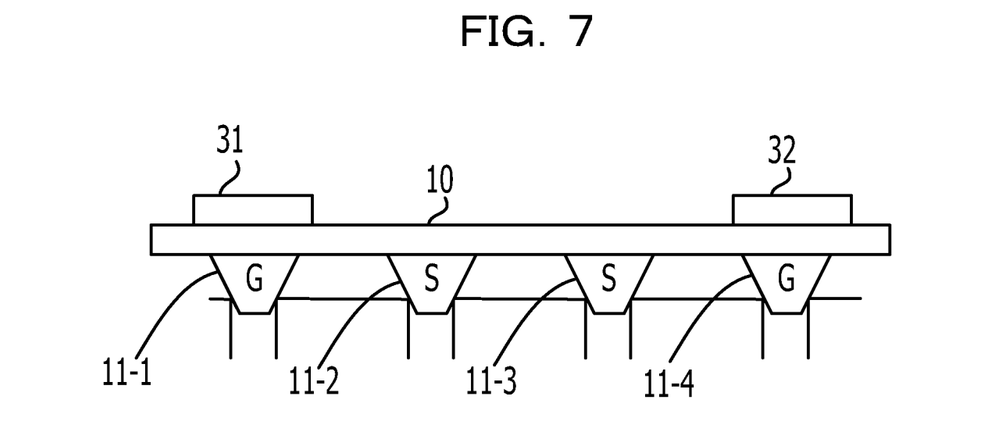
FIG. 7 is a diagram for explaining a placement position of a resistor sheet.

FIG. 7 is a diagram for explaining the placement position of a resistor sheet. In the figure, G indicates a bump connected to a GND line, and S indicates a bump connected to a signal line.

The resistor sheet 31 is provided on a portion of the bump sheet 10, located above the bump 11-1 connected to the GND line, and the resistor sheet 32 is provided on a portion of the bump sheet 10, located above the bump 11-4 connected to the GND line. At this time, the resistor sheets 31 and 32 are disposed so as not to be adjacent to a portion of the bump sheet 10, located above the bumps 11-2 and 11-3 connected to the signal lines.

Figure 8:
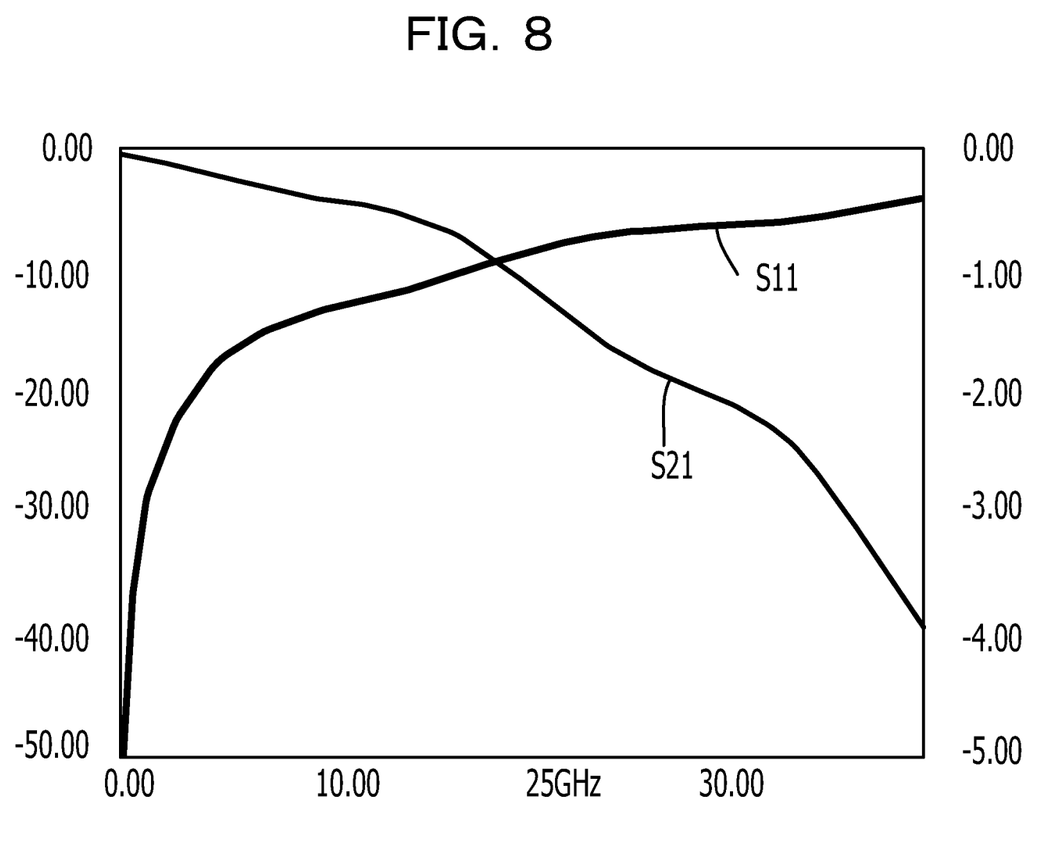
FIG. 8 is a diagram illustrating a loss characteristic.

FIG. 8 is a diagram illustrating a loss characteristic. An S11 parameter (a reflectance loss characteristic) and an S21 parameter (an insertion loss characteristic) when wiring connection is performed using the connector 1 are illustrated. A horizontal axis is a frequency (GHz), a left-side vertical axis is a reflection loss level (dB), and a right-side vertical axis is an insertion loss level (dB).

Using the connector 1 in which the resistor sheet 30 is disposed as illustrated in FIG. 6 and FIG. 7, bump connection is performed, and a signal is transmitted through the signal lines L1p and L1n. Consequently, a noise occurring in a portion where the bump 11-1 connected to the GND lines Lg1 and Lg1-1 and the cover 20 are adjacent to each other is reduced by the resistor sheet 31. In the same way, a noise occurring in a portion where the bump 11-4 connected to the GND lines Lg2 and Lg2-1 and the cover 20 are adjacent to each other is reduced by the resistor sheet 32.

In this case, as illustrated in the simulation result in FIG. 8, the cutoff of the frequency of the transmission signal does not occur in the vicinity of 25 GHz, and it is recognized that it is possible to perform wider bandwidth transmission greater than or equal to 25 GHz.

As described above, the connector 1 has a configuration in which the resistor sheet 30 having electrical resistivity is disposed between the bump sheet 10 and the cover 20. Accordingly, it is possible to cause a transmission signal to have a wider bandwidth by effectively reducing a noise and to promote the improvement of the transmission quality of a high-speed signal.

Next, the mounting pattern of the resistor sheet 30 will be described. The resistor sheet 30 is disposed on the bump sheet 10 located above a bump connected to a GND line, other than a portion located above a bump connected to a signal line. Accordingly, a plurality of patterns may be considered as a mounting form.

Figure 9:
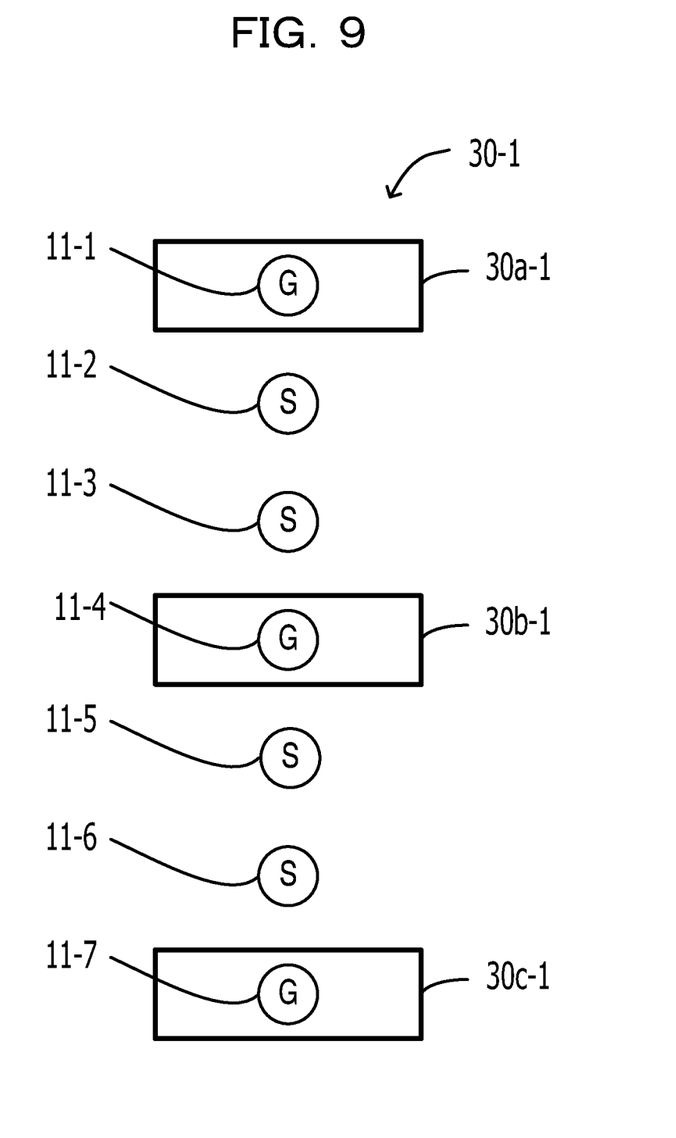
FIG. 9 is a diagram illustrating an example of a mounting pattern of a resistor sheet.
Figure 10:
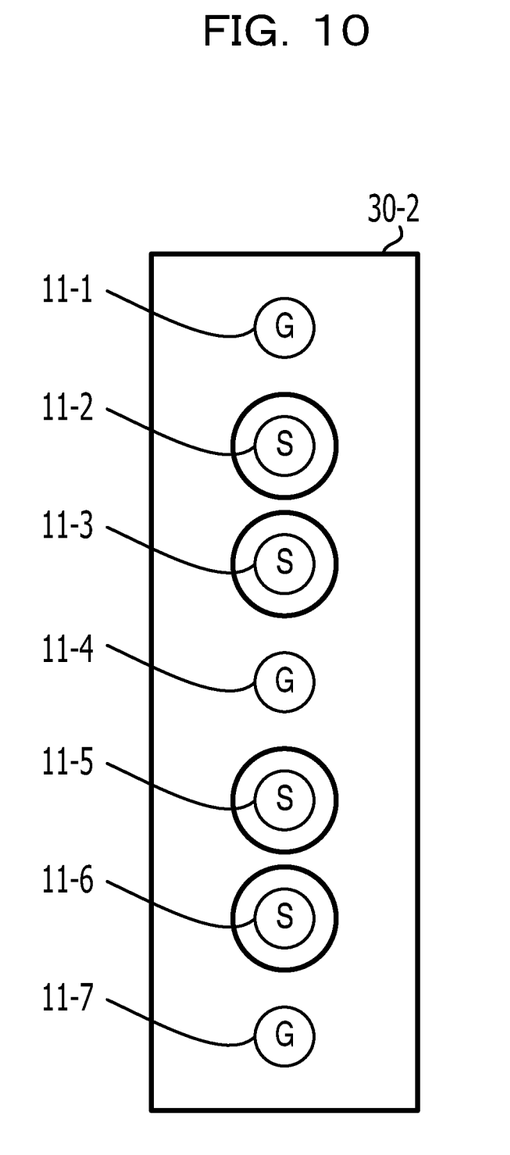
FIG. 10 is a diagram illustrating an example of a mounting pattern of a resistor sheet.
Figure 11:
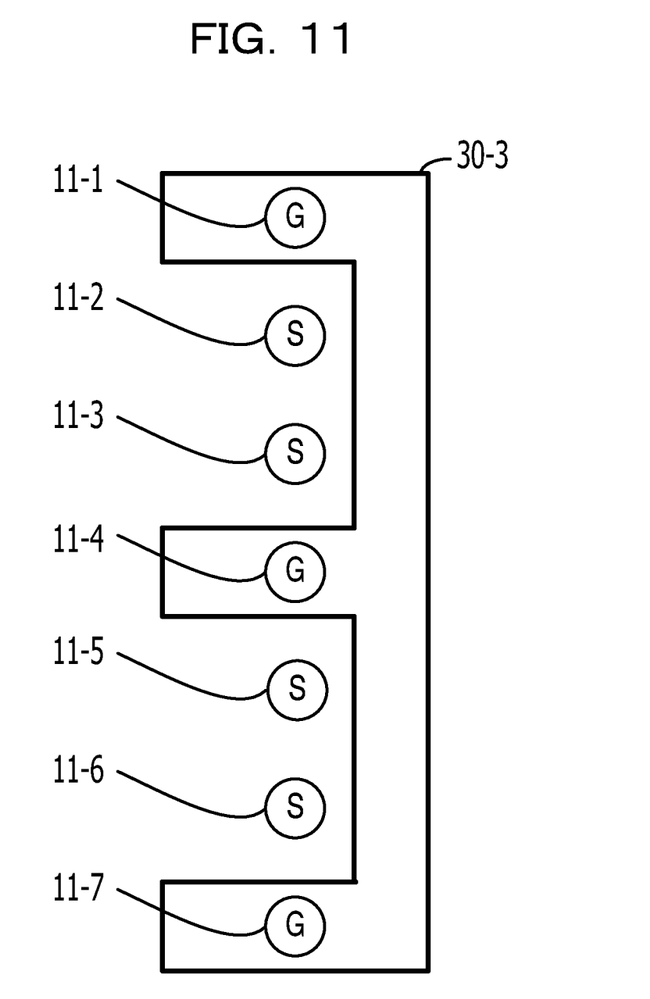
FIG. 11 is a diagram illustrating an example of a mounting pattern of a resistor sheet.

FIG. 9 to FIG. 11 are diagrams illustrating examples of a mounting pattern of the resistor sheet. In the figures, G indicates a bump connected to a GND line, and S indicates a bump connected to a signal line.

In the case of a resistor sheet 30-1 in FIG. 9, the form pattern thereof is the same as that illustrated in FIG. 6 and FIG. 7. Resistor sheets 30a-1, 30b-1, and 30c-1 having quadrilateral forms are disposed at positions of the bump sheet 10 located above bumps 11-1, 11-4, and 11-7 connected to GND lines.

In the case of a resistor sheet 30-2 in FIG. 10, the form pattern thereof has a form in which resistor sheet portions located above bumps 11-2, 11-3, 11-5, and 11-6 connected to signal lines are cut out. A resistor sheet 30-3 in FIG. 11 has a comb-shaped mounting pattern in which a resistor sheet is disposed over bumps 11-1, 11-4, and 11-7 connected to GND lines, other than portions located above the bumps 11-2, 11-3, 11-5, and 11-6 connected to signal lines.

In addition, FIG. 9 to FIG. 11 are examples of the mounting pattern, and a form other than the above-mentioned examples may be adopted. On the other hand, while, in the above description, a configuration has been adopted in which the resistor sheet 30 is mounted with being placed at a predetermined position between the bump sheet 10 and the cover 20, the resistor sheet 30 may be attached to the bump sheet 10 with forming no difference in level.

For example, in the case of FIG. 9, the resistor sheets 30*a*-1, 30*b*-1, and 30*c*-1 are attached to predetermined positions of the bump sheet 10 on which the three resistor sheets are disposed, with forming no difference in level, and the resistor sheet 30-1 and the bump sheet 10 are integrated with each other.

Here, if the resistor sheet 30 is only disposed on the bump sheet 10 located above a bump connected to a GND line, and connector connection based on the depression of the cover 20 is performed, pressures possibly become uneven at a point at which the resistor sheet is disposed and a point at which no resistor sheet is disposed.

Accordingly, the resistor sheet 30 and the bump sheet 10 are attached to a predetermined position of the bump sheet 10 above a bump connected to a GND line, with forming no difference in level, and the resistor sheet 30 and the bump sheet 10 are integrated with each other. By adopting such a configuration, it is possible to make more uniform a suppress strength based on the cover 20 at the time of connector connection, and to further promote the improvement of a contact characteristic.

Figure 12:
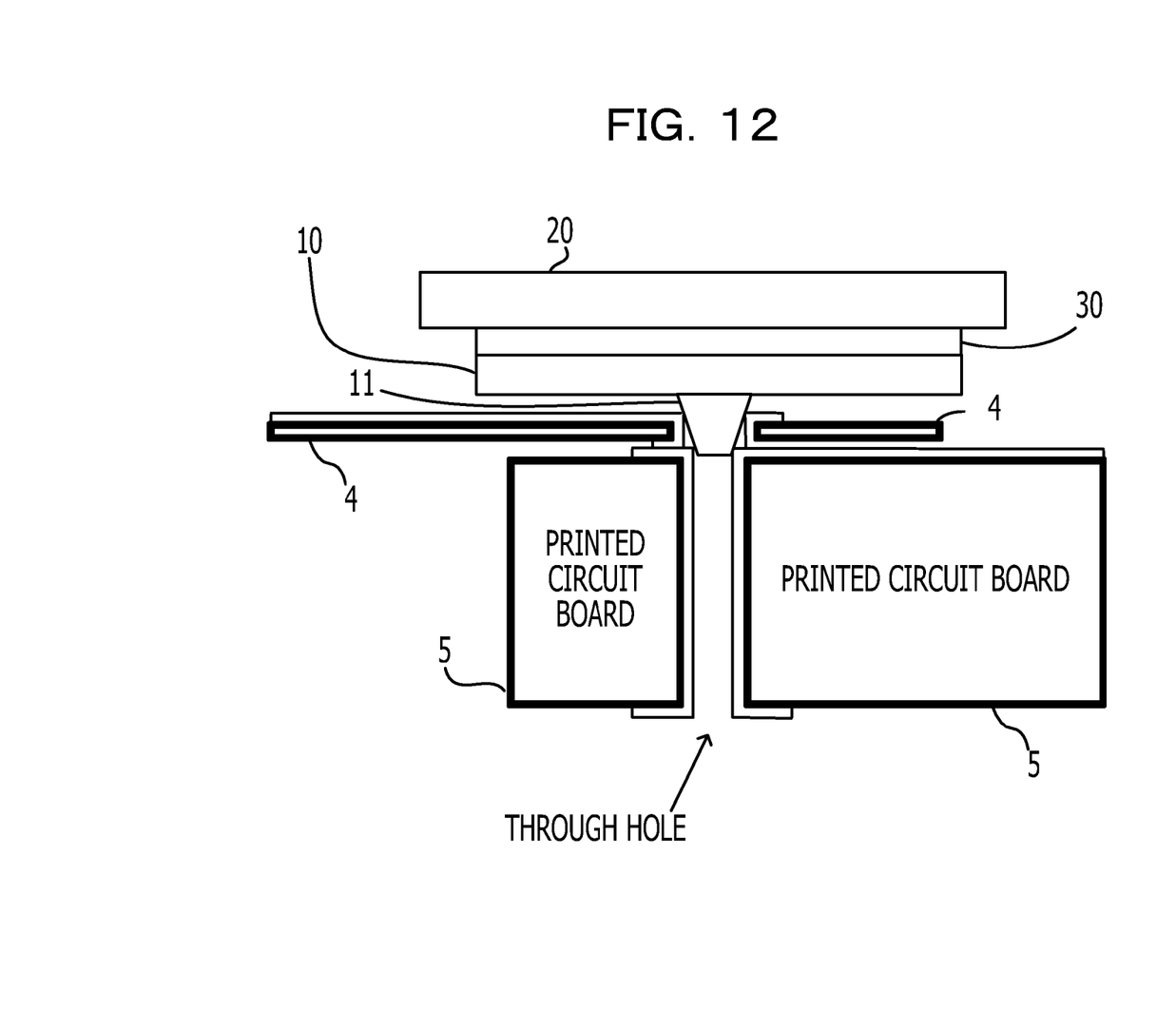
FIG. 12 is a diagram illustrating a bump connection portion.
Figure 13:
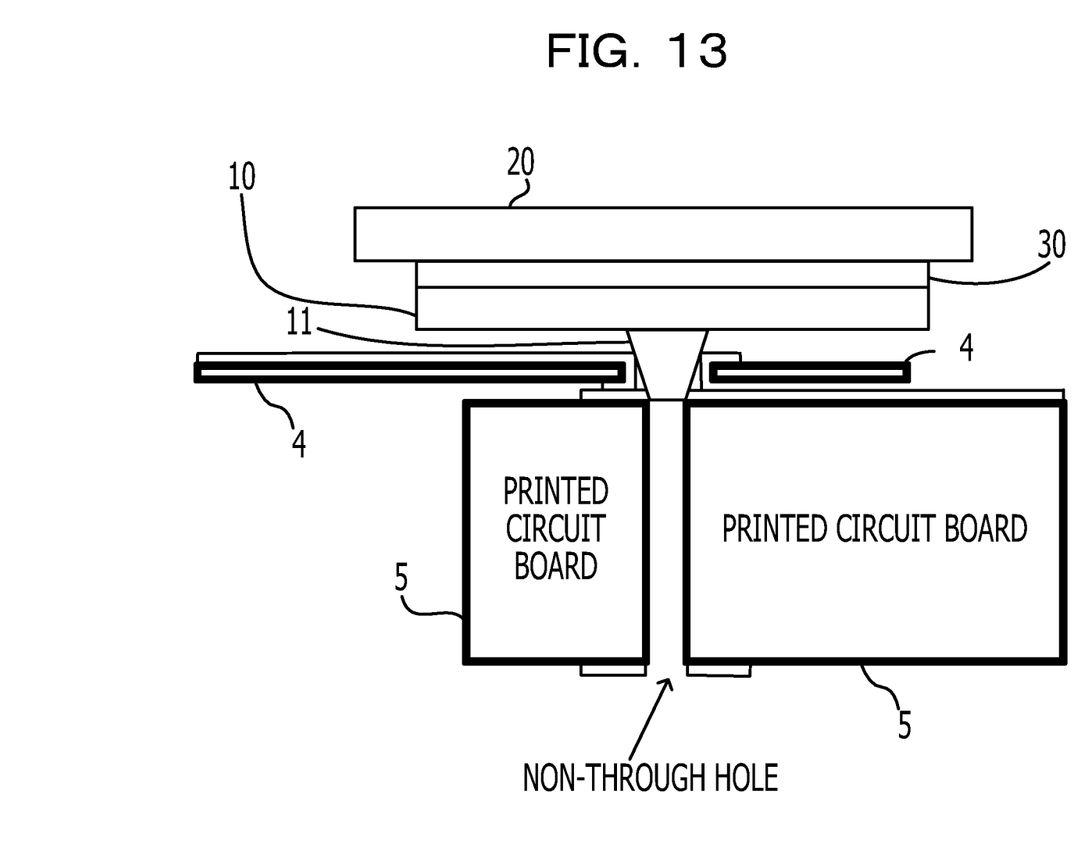
FIG. 13 is a diagram illustrating a bump connection portion.
Figure 14:
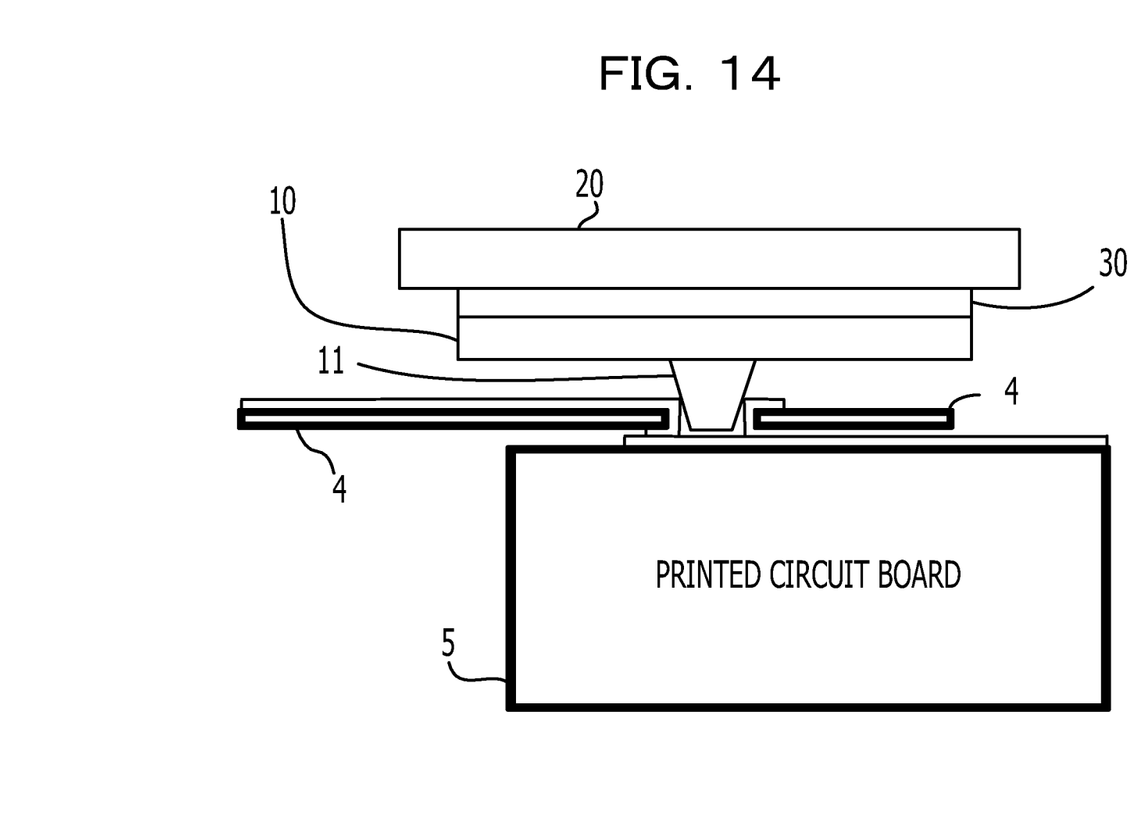
FIG. 14 is a diagram illustrating a bump connection portion.

Next, the connection portion of a bump will be described. FIG. 12 to FIG. 14 are diagrams illustrating bump connection portions, and illustrate variations of a bump connection portion.

FIG. 12 is a case in which through holes are provided in the flexible printed circuit board 4 and the printed circuit board 5. FIG. 13 is a case in which a through hole is provided in the flexible printed circuit board 4 and a non-through hole, to which the metal foil of a through hole is not coated, is provided in the printed circuit board 5. FIG. 14 is a case in which a through hole is provided in the flexible printed circuit board 4 and neither a through hole nor a non-through hole is provided in the printed circuit board 5.

In each bump connection in FIG. 12 to FIG. 14, the PAD of the flexible printed circuit board 4 is placed on the PAD of the printed circuit board 5, the bump 11 is placed on the PAD of the flexible printed circuit board 4, and a suppress strength is applied from the top of the cover 20 through the resistor sheet 30. Accordingly, a transmission line on the flexible printed circuit board 4 and a transmission line on the printed circuit board 5 are electrically connected to each other.

Here, as illustrated in FIG. 12, through holes are provided in the flexible printed circuit board 4, through holes are provided in the printed circuit board 5, and then bump connection is performed. Therefore, a contact characteristic between the flexible printed circuit board 4 and the printed circuit board 5 is improved.

On the other hand, when a non-through hole is applied to a connection point of the printed circuit board 5 as illustrated in FIG. 13 or when a through hole is only provided in the flexible printed circuit board 4 as illustrated in FIG. 14, it is possible to make a signal line land diameter smaller, and hence a high-frequency characteristic can be improved. In addition, since it is possible to suppress the formation of an open stub (a microstripline branching from a main transmission path and whose leading end is open), it is also possible to reduce the deterioration of a characteristic due to the stub.

While, as described above, the embodiments have been exemplified, the configurations of individual portions illustrated in the embodiments may be replaced with others having the same functions. In addition, another arbitrary constituent element or process may be added thereto.

Transmission quality at the time of connector connection is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. A connector comprising:
   an electrode sheet on a side of which a plurality of electrodes are attached, the electrode sheet being an insulator;
   a metal cover configured to entirely cover the electrode sheet and a resistor sheet; and
   the resistor sheet configured to be provided between the metal cover and the electrode sheet, the resistor sheet having electrical resistivity.

2. The connector according to claim 1, wherein
   the resistor sheet is provided at a position where the resistor sheet suppresses a noise occurring through an electrode connected to a board.

3. The connector according to claim 1, wherein
   the resistor sheet is provided at a position located on a surface of a side to which an electrode of the electrode sheet is not attached and located above an electrode connected to a GND line wired on a board.

4. The connector according to claim 3, wherein
   the resistor sheet is attached to the electrode sheet without forming a difference in level, and
   the resistor sheet and the electrode sheet are integrated with each other.

5. The connector according to claim 1, wherein
   the cover includes a hook that is hooked to a board and applies a uniform pressure to the plurality of electrodes from a back surface of the electrode sheet.

6. The connector according to claim 1, further comprising the resistor sheet being in contact with the electrode sheet.

7. An optical transmission device comprising:
   a first board that includes an optical transmission processor and a first transmission path which is electrically connected to the optical transmission processor, the optical transmission processor performing transmission processing for an optical signal;
   a second board that includes a second transmission path; and
   a connector configured to electrically connect the first transmission path and the second transmission path to each other, wherein the connector includes
an electrode sheet on a side of which a plurality of electrodes are attached, the electrode sheet being an insulator;
a metal cover configured to entirely cover the electrode sheet and a resistor sheet; and
the resistor sheet configured to be provided between the metal cover and the electrode sheet, the resistor sheet having electrical resistivity, and
the plurality of electrodes connects the first transmission path and the second transmission path.

8. The optical transmission device according to claim 7, wherein
the resistor sheet is provided at a position where the resistor sheet suppresses a noise occurring through an electrode connected to a board.

9. The optical transmission device according to claim 7, wherein
the resistor sheet is provided at a position located on a surface of a side to which an electrode of the electrode sheet is not attached and located above an electrode connected to a GND line wired on the first board.

10. The optical transmission device according to claim 9, wherein
the resistor sheet is attached to the electrode sheet without forming a difference in level, and
the resistor sheet and the electrode sheet are integrated with each other.

11. The optical transmission device according to claim 7, wherein
the connector includes the cover including a hook that is hooked to the second board and applies a uniform pressure to the plurality of electrodes from the back surface of the electrode sheet.

12. The optical transmission device according to claim 7, further comprising the resistor sheet being in contact with the electrode sheet.

13. A connector connection method comprising:
disposing a resistor sheet having electrical resistivity between an electrode sheet to which a plurality of electrodes are attached and a metal cover which entirely covers the electrode sheet and the resistor sheet; and
depressing the metal cover from the top thereof and performing connection using a connector including the plurality of electrodes.

14. The method according to claim 13, wherein
the resistor sheet is provided at a position where the resistor sheet suppresses a noise occurring through an electrode connected to a board.

15. The method according to claim 13, wherein
the resistor sheet is provided at a position located on a surface of a side to which an electrode of the electrode sheet is not attached and located above an electrode connected to a GND line wired on a board.

16. The method according to claim 13, wherein
the resistor sheet is attached to the electrode sheet without forming a difference in level, and
the resistor sheet and the electrode sheet are integrated with each other.

17. The method according to claim 13, wherein
the connector includes a hook applying a uniform pressure to the plurality of electrodes from a back surface of the electrode sheet and is hooked to another board.

18. The connector according to claim 1, further comprising the resistor sheet being adjacent to the electrode sheet.

19. The optical transmission device according to claim 7, further comprising the resistor sheet being adjacent to the electrode sheet.

20. The method according to claim 13, further comprising disposing the resistor sheet adjacent to the electrode sheet.

21. The method according to claim 13, further comprising disposing the resistor sheet in contact with the electrode sheet.

* * * * *